Patented May 24, 1932

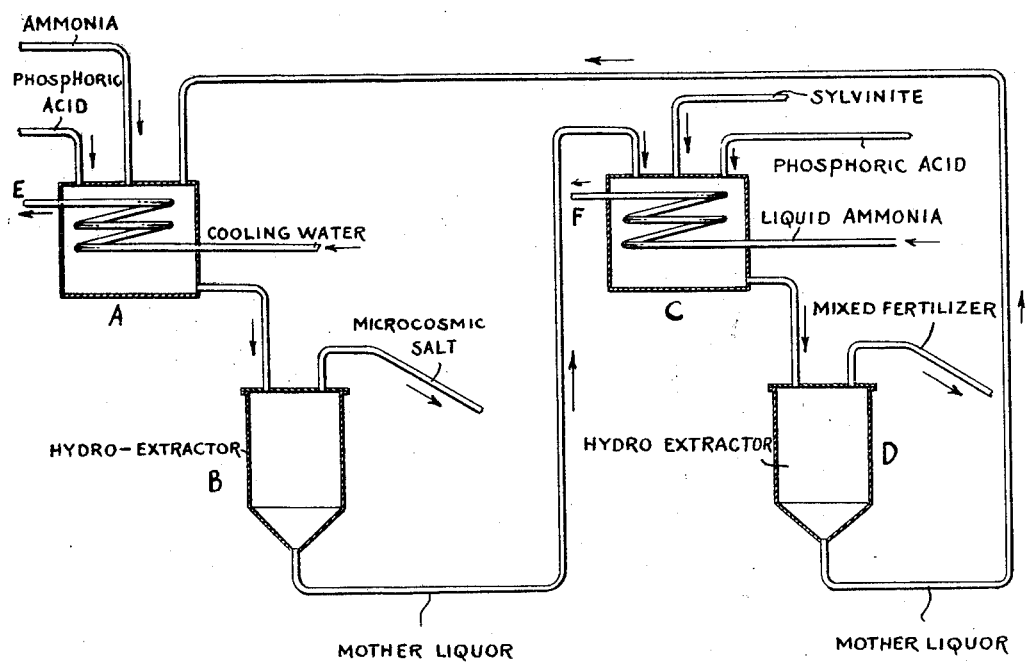

1,859,835

UNITED STATES PATENT OFFICE

FERDINAND MITTEAU, OF VILLEMOMBLE, FRANCE, ASSIGNOR TO SOCIÉTÉ D'ETUDES SCIENTIFIQUES ET D'ENTREPRISES INDUSTRIELLES, OF OUGREE, BELGIUM, A FIRM

PROCESS FOR THE MANUFACTURE OF MICROCOSMIC SALT AND OTHER FERTILIZING MATERIAL

Application filed March 8, 1930, Serial No. 434,453, and in Germany March 9, 1929.

This invention relates to a manufacturing process whereby on one hand microcosmic salt and on the other hand potassium chloride and ammonium chloride mixed together or separated can be produced simultaneously from sodium chloride and potassium chloride solutions (namely solutions of such natural minerals as sylvinite). The process according to this invention consists in treating a solution of sodium chloride and potassium chloride with phosphoric acid and ammonia taken in the proportion of one mole of phosphoric acid to two moles of ammonia, suitably cooling the liquor in order to separate the microcosmic salt therefrom, after which, by any known method, particularly by an addition of suitable precipitants such as an alkali-metal chloride, both the potassium chloride present in the sylvinite and remaining in solution, and the ammonium chloride generated together with the microcosmic salt as a result of the action of the phosphoric acid and the ammonia upon the sodium chloride in the solution, are caused to precipitate alone or together.

The phosphoric acid and the ammonia may both be taken in the free state in the form of solutions or vapours or in the combined state in the form of diammonium phosphate or mono-ammonium phosphate and ammonia.

The following results are thus obtained:—

First of all, microcosmic salt is prepared, which is a fertilizer much appreciated for its high content in the fertilizing constituents $P_2O_5$ and $N_2$ and its stability; on the other hand, a separation is obtained between the potassium chloride and the sodium chloride in the sylvinite while at the same time there is obtained either ammonium chloride if the ammonium chloride and potassium chloride be caused to crystallize separately, or a fertilizing material consisting of a mixture of both chlorides, which is known as "potazote", if both chlorides are caused to crystallize together.

A practical method for carrying this invention into effect will now be described by way of example, the result aimed at being the production of "potazote" by a continuous cycle process.

*1st step*.—To the mother liquors remaining from the crystallization of the "potazote" produced in a previous cycle of operation there is added a phosphoric acid solution the concentration of which will preferably be such as will allow the initial volume of mother liquors to be obtained at the end of the successive operations to be described hereinafter without the necessity of either adding or vaporizing any water. It has been found in practice that with sylvinite of normal composition a 35–40° Bé. concentration will lead to the result stated.

Then, the liquor thus provided is treated with gaseous ammonia, care being taken that the temperature does not exceed 50° C. at the end of the treatment in order to avoid ammonia losses which might happen to take place at that time. That the desired degree of saturation is arrived at will be evidenced by the solutions being almost perfectly neutral under the litmus test.

Now if the liquor is cooled or simply allowed to cool, the greater portion of the sodium will separate in the form of crystallized microcosmic salt, and if care is taken not to cool the liquor or allow same to cool below the temperature at which potassium chloride and ammonium chloride will begin to settle, the microcosmic salt separated from the liquor in a suitable manner will be substantially free from either salts.

Practically, however, it will be tried as much as possible to approximate the temperature at which the mixture of potassium chloride and ammonium chloride begins to settle in order to increase the yield of the process in microcosmic salt; as this temperature is generally close to ordinary temperature, this is one of the advantages afforded by the process.

Thereafter, the microcosmic salt is drained and dried, the drained liquid being added to the mother liquors from the separation process.

*2nd step*.—To the liquor thus obtained, crushed sylvinite is added in such quantity that the amount of sodium in the sylvinite shall precisely be equal to the amount of sodium which has just come out of the cycle of operation in the form of microcosmic salt.

Then the solution thus obtained is cooled strongly in order to cause as much of "potazote" as possible to crystallize out and, here again, to increase the yield of the process to a maximum. For instance, if the ammonia is available in the liquid state, advantage may be taken of the cold units produced by the evaporation of such ammonia. The "potazote" which separates as a result of the cooling is drained and dried. Here again, the drained mother liquors are added to the mother liquors from the "potazote" separation, the mixture thus obtained being taken again into the cycle as pointed out hereinbefore in connection with the first step. The "potazote" obtained has the same composition as the "potazote" obtained by the well known Solvay reaction carried out on sylvinite, inasmuch as in both cases it will correspond to that of the original sylvinite. It however contains from 2 to 3 per cent of $P_2O_5$ due to the presence of a small amount of microcosmic salt which crystallized together with the "potazote".

The presence of $P_2O_5$ in the "potazote", however, may be avoided practically completely.

For this purpose it will be sufficient to slightly acidify the liquor after the microcosmic salt has been separated therefrom. By cooling the liquor a "potazote" will thus be obtained which contains practically no $P_2O_5$. The acid added will preferably be phosphoric or hydrochloric acid, but another acid, such as sulphuric acid may likewise be used. When phosphoric or hydrochloric acid is employed as an acidifying agent, the fertilizer which crystallizes out still consists exclusively of a mixture of potassium chloride and ammonium chloride; the acidification may be carried out with or without a simultaneous addition of a mineral.

Particularly, when the operation is carried out in a closed cycle as in the foregoing example, the mother liquors remaining after the microcosmic salt is separated will be mixed with sylvinite and a certain percentage of phosphoric acid; the quantity of phosphoric acid added will depend on the temperature at which the microcosmic salt has been made to crystallize; practically; it will be close to 15 per cent of the total phosphoric acid used in the cycle of operation. The remaining phosphoric acid, i. e. practically 85 per cent of the amount used in the cycle, is to be added to the mother liquors remaining after the "potazote" has been separated. It follows that the proportion of ammonia necessary in the process will practically be slightly in excess of two moles of ammonia to each mole of the acid just admixed.

The example given above refers to a practical process for obtaining microcosmic salt and "potazote" simultaneously from mother liquors circulating in a closed cycle. However, this process is not the only one possible. Thus, starting from a mere aqueous solution of sylvinite, microcosmic salt might be precipitated first, then potassium chloride or ammonium chloride or a mixture of both by adding one or more suitable precipitants. Instead of admixing a precipitant, the solution might be brought to sufficient concentration, then cooled if necessary; generally, any usual process of fractionated crystallization might be resorted to.

The potassium chloride and ammonium chloride may then be obtained mixed with the whole or part of the microcosmic salt which has not entirely crystallized and still remains in solution.

However, even when the fractionated crystallization process has been resorted to instead of an addition of precipitating bodies, it is possible to obtain the potassium chloride and ammonium chloride either in the separated or in the mixed state without any microcosmic salt being contained therein. For this purpose, after the microcosmic salt crystallized is separated, it is sufficient that the microcosmic salt which remained in solution be transformed into $P_2O_8Na(NH_4)_5$. With this object in view, the solution will be treated at boiling temperature with an excess of ammonia, which will cause the said salt to crystallize. The said salt is as stable as microcosmic salt and likewise provides a valuable fertilizer on account of its high percentage in fertilizing elements.

The process according to the present invention is diagrammatically shown in the appended drawing. The mother liquor from which potazote has been separated in the hydro-extractor D is returned to the crystallizer A, in which phosphoric acid and ammonia are introduced, and the crystallization of microcosmic salt, which is promoted by the circulation of cooling water through the cooling coil E, takes place. The separation of the crystallized microcosmic salt is effected in the hydro-extractor B, from which the mother liquor is conveyed into the crystallizer C, in which sylvinite and acidifying phosphoric acid are added, and the crystallization of potazote takes place under the cooling effect due to the vaporization of the liquid ammonia which circulates through the cooling coil F. The crystallized potazote is separated from the mother liquor in the hydro-extractor D, from which, as aforesaid, the mother liquor is returned to the crystallizer A.

Claims:

1. The process of separating one from the other the sodium and the potassium of minerals containing sodium chloride and potassium chloride, which comprises precipitating the sodium as microcosmic salt by treating said minerals in the cold with water, phosphoric acid and ammonia in the proportion of one mole of phosphoric acid and two moles of ammonia for each mole of sodium chloride.

2. The process of separating one from the other the sodium and the potassium of minerals containing sodium chloride and potassium chloride, which comprises precipitating the sodium as microcosmic salt by treating said minerals in the cold with water and diammonium phosphate in the proportion of one mole of diammonium phosphate for each mole of sodium chloride.

3. The process of separating one from the other the sodium and the potassium of minerals containing sodium chloride and potassium chloride, which comprises precipitating the sodium as microcosmic salt by treating said minerals in the cold with water, monoammonium phosphate and ammonia in the proportion of one mole of monoammonium phosphate and one mole of ammonia for each mole of sodium chloride.

4. A process for simultaneously producing microcosmic salt and a mixture of potassium chloride and ammonium chloride which comprises treating in the cold a solution containing both sodium chloride and potassium chloride with phosphoric acid and ammonia in the proportion of one mole of phosphoric acid to two moles of ammonia, separating the microcosmic salt formed, and salting out from the mother liquor a mixture of potassium chloride and ammonium chloride by addition of the chloride of an alkali metal.

5. A process for simultaneously producing microcosmic salt and a mixture of potassium chloride and ammonium chloride which comprises treating in the cold a solution containing both sodium chloride and potassium chloride with phosphoric acid and ammonia in the proportion of one mole of phosphoric acid to two moles of ammonia, separating the microcosmic salt formed, treating the solution with an acid, and separating a mixture of potassium chloride and ammonium chloride by cooling the solution.

6. A process for simultaneously producing microcosmic salt and a mixture of potassium chloride and ammonium chloride which comprises treating in the cold a solution containing both sodium chloride and potassium chloride with phosphoric acid and ammonia in the proportion of one mole of phosphoric acid to two moles of ammonia, separating the microcosmic salt formed, adding hydrochloric acid to the solution, and separating a mixture of potassium chloride and ammonium chloride by cooling the solution.

7. A process for simultaneously producing microcosmic salt and a mixture of potassium chloride and ammonium chloride which comprises treating in the cold a solution containing both sodium chloride and potassium chloride with phosphoric acid and ammonia in the proportion of one mole of phosphoric acid to two moles of ammonia, separating the microcosmic salt formed, adding phosphoric acid to the solution, and separating a mixture of potassium chloride and ammonium chloride by cooling the solution.

8. A process for alternately separating microcosmic salt and a mixture of potassium chloride and ammonium chloride from a solution, which comprises treating in the cold the solution, after separation of the mixture of both chlorides therefrom, with phosphoric acid and ammonia in such proportions as to form diammonium phosphate in the solution, separating from the solution the microcosmic salt formed, treating the solution with a quantity of mineral containing both sodium chloride and potassium chloride equivalent to the quantity of the phosphoric acid previously added, cooling the solution, and separating the mixture of potassium chloride and ammonium chloride which crystallizes therefrom.

9. A process for alternately separating microcosmic salt and a mixture of potassium chloride and ammonium chloride from a mother liquor, which comprises treating in the cold the solution, after separation of the mixture of both chlorides therefrom, with phosphoric acid and ammonia in such proportions as to form diammonium phosphate in the solution, cooling the solution, separating therefrom the microcosmic salt formed, treating the solution with an acid and with a quantity of mineral containing both sodium chloride and potassium chloride equivalent to the quantity of the phosphoric acid previously added, further cooling the solution, and separating the mixture of potassium chloride and ammonium chloride which crystallizes therefrom.

10. A process for simultaneously producing microcosmic salt and a mixture of potassium chloride and ammonium chloride which comprises treating in the cold a solution containing both sodium chloride and potassium chloride with phosphoric acid and ammonia in the proportion of one mole of phosphoric acid to two moles of ammonia, separating the microcosmic salt formed, treating the mother liquor with an excess of ammonia at boiling temperature, separating the crystallizing salt, cooling down the mother liquor, and separating the mixture of potassium chloride and ammonium chloride which crystallizes therefrom.

In testimony whereof I affix my signature.

FERDINAND MITTEAU.